(12) United States Patent
Fu et al.

(10) Patent No.: US 11,709,250 B2
(45) Date of Patent: *Jul. 25, 2023

(54) ESTIMATING THREE-DIMENSIONAL TARGET HEADING USING A SINGLE SNAPSHOT

(71) Applicant: Inceptio Technology, Inc., Fremont, CA (US)

(72) Inventors: Kan Fu, Fremont, CA (US); Ji Jia, Fremont, CA (US); Yu Liu, Fremont, CA (US)

(73) Assignee: INCEPTIO HONGKONG LIMITED, Kowloon (HK)

( * ) Notice: Subject to any disclaimer, the term of this patent is extended or adjusted under 35 U.S.C. 154(b) by 256 days.

This patent is subject to a terminal disclaimer.

(21) Appl. No.: 17/010,411

(22) Filed: Sep. 2, 2020

(65) Prior Publication Data

US 2022/0066021 A1 Mar. 3, 2022

(51) Int. Cl.
*G01S 13/86* (2006.01)
*G01S 13/931* (2020.01)
*G01S 17/894* (2020.01)
*G06N 3/08* (2023.01)
*G01S 13/00* (2006.01)

(52) U.S. Cl.
CPC .......... *G01S 13/867* (2013.01); *G01S 13/865* (2013.01); *G01S 13/931* (2013.01); *G01S 17/894* (2020.01); *G06N 3/08* (2013.01); *G01S 2013/93271* (2020.01); *G01S 2013/93272* (2020.01); *G01S 2013/93274* (2020.01)

(58) Field of Classification Search
None
See application file for complete search history.

(56) References Cited

U.S. PATENT DOCUMENTS

| 10,222,472 B2* | 3/2019 | Cuichun | G01S 17/931 |
| 2017/0097412 A1* | 4/2017 | Liu | G01S 13/931 |
| 2019/0361106 A1* | 11/2019 | Stachnik | G01S 13/584 |

* cited by examiner

*Primary Examiner* — Bernarr E Gregory

(57) ABSTRACT

Provided herein is a system and method to determine a three-dimensional heading of a target. The system includes a radar sensor that obtains a three-dimensional snapshot of radar data comprising Doppler velocities and spatial positions of a plurality of detection points of a target, one or more processors, and a memory storing instructions that, when executed by the one or more processors, causes the system to perform conducting a first estimation of a three-dimensional heading of the target based on the spatial positions; conducting a second estimation of the three-dimensional heading of the target based on the Doppler velocities; and obtaining a combined estimation of the three-dimensional heading of the target based on a weighted sum of the first estimation and the second estimation.

19 Claims, 14 Drawing Sheets

ESTIMATING THREE-DIMENSIONAL TARGET HEADING USING A SINGLE SNAPSHOT

TECHNICAL FIELD

The present disclosure relates generally to navigation of vehicles such as autonomous trucks by initially estimating headings of targets such as other vehicles.

BACKGROUND

Radar applications that utilize the Doppler effect include aviation, satellites, meteorology, radiology, and navigation. Doppler shift measurements are used to estimate a position and a velocity of a moving object. A radar beam may be emitted towards the moving object. A frequency detected by the moving object is different from the emitted frequency of the radar beam. A radar sensor may compare a frequency of a received signal that is reflected by the moving object with the emitted frequency to determine an instantaneous velocity of the moving object. Radar signals may be robust against different lighting and weather conditions such as rain and fog.

SUMMARY

The current approach, in one embodiment, fuses two techniques using a single snapshot comprising radar data of multiple positions of a target moving object. The first technique estimates a three-dimensional (3D) target heading based on an overall spatial distribution or configuration of these positions. The second technique estimates the 3D target heading based on Doppler velocities at these positions. The fusion of the two techniques validates the estimate using the 3D single snapshot.

Described herein are systems and methods to determine or estimate a 3D heading of a target. Various embodiments of the present disclosure provide a system comprising a radar sensor configured to obtain at least a portion of a 3D snapshot of radar data comprising Doppler velocities and spatial positions of a plurality of detection points of a target; one or more processors; and a memory storing instructions that, when executed by the one or more processors, causes the system to perform: conducting a first estimation of the 3D heading of the target based on the spatial positions; conducting a second estimation of the 3D heading of the target based on the Doppler velocities; and obtaining a combined estimation of the 3D heading of the target based on a weighted sum of the first estimation and the second estimation.

In some embodiments, if the snapshot may comprise outliers or irrelevant data points, the instructions may cause the system to perform conducting the first estimation based on an overall configuration, distribution, or a union of a subset of the detection points corresponding to the spatial positions. In the Specification, a subset of the detection points may, in some embodiments, include or refer to all of the detection points or only a portion of the detection points.

In some embodiments, the instructions further cause the system to perform: determining a first weight associated with the first estimation of the weighted sum and a second weight associated with the second estimation of the weighted sum based on respective first and second weights, obtained from a previous cycle, at a location within a threshold distance of at least a portion of the spatial positions.

In some embodiments, the conducting the second estimation is further based on a least squares solution of a velocity vector of the target.

In some embodiments, the conducting the second estimation is further based on directions from each of the detection points to a radar sensor used to obtain the 3D snapshot and magnitudes of Doppler speeds at each of the detection points.

In some embodiments, the instructions further cause the system to perform, in response to a number of detection points along a dimension not satisfying a threshold, fusing, using a convolutional neural network (CNN), remaining detection points along other two dimensions with Lidar data along the dimension.

In some embodiments, the instructions further cause the system to perform determining, based on the first estimation, a 3D bounding region enclosing the detection points, the 3D bounding region indicating an orientation and a dimension of the target.

In some embodiments, the conducting the first estimation of the heading comprises determining a cuboid bounding region that minimizes a sum of distances from each detection point to a surface of the cuboid bounding region.

In some embodiments, the distances are determined from each detection point to a nearest surface of the determined cuboid bounding region.

In some embodiments, the instructions further cause the system to perform determining a first weight associated with the first estimation of the weighted sum and a second weight associated with the second estimation of the weighted sum based on a variance of the combined estimation.

In some embodiments, the system further comprises a second radar sensor configured to obtain a second portion of the 3D snapshot comprising the radar data; and the determining the 3D boundary region is based on the portion and the second portion of the 3D snapshot.

In some embodiments, the instructions further cause the system to perform: obtaining a second 3D snapshot of Lidar data comprising a plurality of second detection points within second threshold distances of at least a portion of the detection points; determining, based on the second 3D snapshot, a second 3D bounding region enclosing the second detection points; determining whether surfaces of the second 3D bounding region are within third threshold distances of surfaces of the 3D bounding region; and in response to determining that the surfaces of the second 3D bounding region are within third threshold distances of the surfaces of the 3D bounding region, fusing the 3D bounding region and the second 3D bounding region. In some embodiments, the second 3D snapshot may be obtained at a same time as the 3D snapshot or within a threshold amount of time of obtaining the 3D snapshot.

In some embodiments, the instructions further cause the system to perform: obtaining a third 3D snapshot of camera data comprising a plurality of third detection points within third threshold distances of at least a portion of the detection points; determining, based on the third snapshot, a third 3D bounding region enclosing the third detection points; determining whether surfaces of the third 3D bounding region are within fourth threshold distances of surfaces of the 3D bounding region; and in response to determining that the boundaries of the third 3D bounding region are within fourth threshold distances of the boundaries of the 3D bounding region, fusing the 3D bounding region and the third 3D bounding region. In some embodiments, the second snapshot may be obtained at a same time as the 3D snapshot and/or the second 3D snapshot or within a threshold amount of time of obtaining the 3D snapshot and/or the second 3D snapshot.

In some embodiments, each of the detection points contacts a surface of the bounding region or is located in an interior of the bounding region.

Various embodiments of the present disclosure provide a method implemented by a system as described above.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In some situations, multiple snapshots or frames of detection data may be employed to estimate a heading of a target such as a vehicle. However, capturing and processing multiple snapshots at different times results in additional latency and downstream processing delays due to track identification, track initiation, and track deletion, for example. Occasionally, only a single snapshot of data may be accessible, thereby presenting a challenge.

In an effort to address challenges associated with obtaining multiple snapshots or frames from radar, camera, and Lidar data, and to expedite the downstream processing of the data, the current technology provides a computer system associated with a vehicle that reliably estimates a heading of a target using only a single snapshot or frame of radar data. By estimating a heading of a target using only a single snapshot, the current approach greatly enhances a performance and decreases a computation time while ensuring accuracy of the target heading estimate. Additionally, the target heading estimate may be obtained even if the target is not completely visible in a field of view of a camera or other image sensor. By accurately estimating a heading, the computer system may reliably infer a direction in which the target is moving and/or an intention of the target. Using this direction and/or the intention, the computer system may navigate or plan a route that avoids hitting the target.

Figure 1:
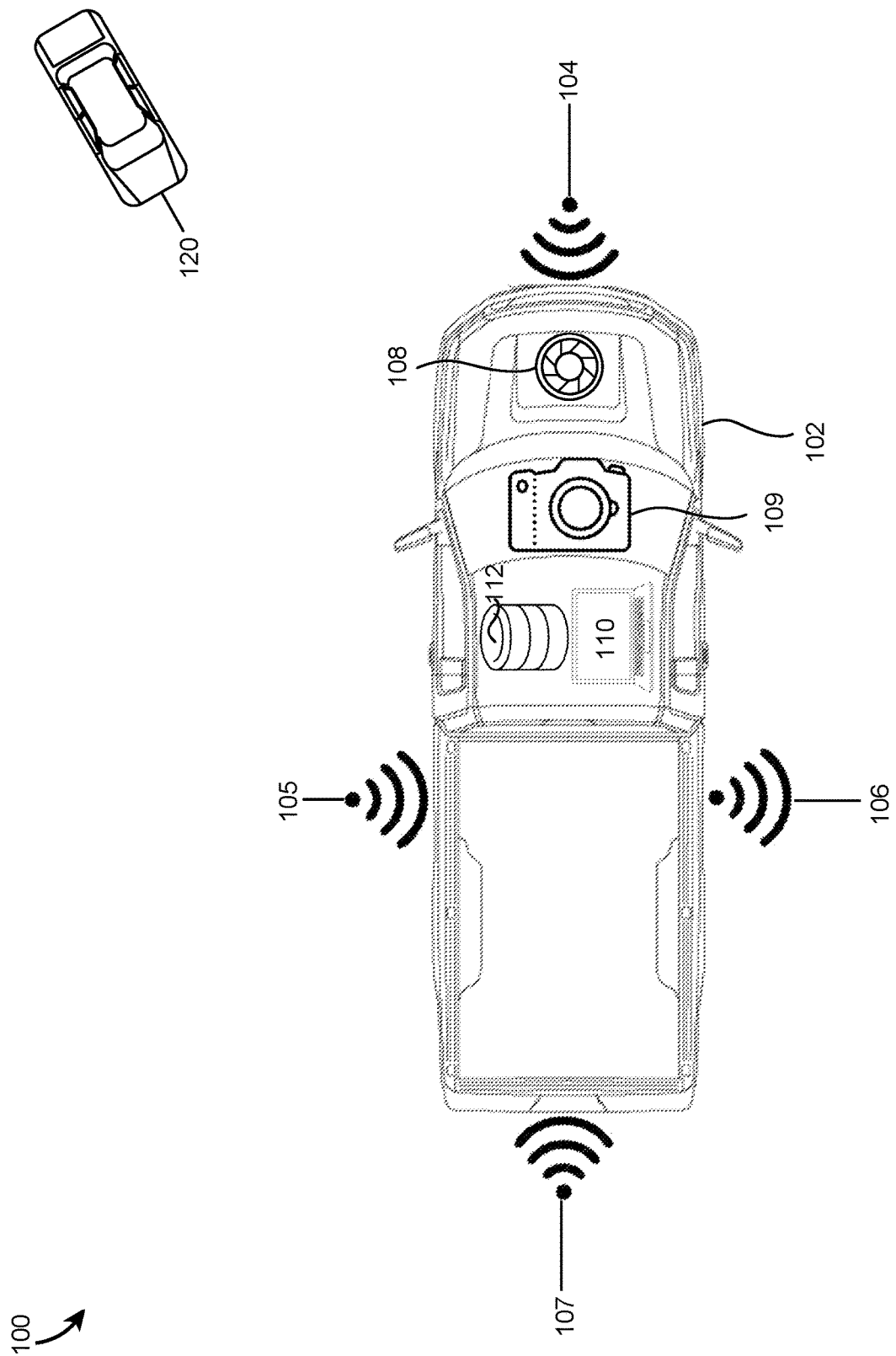
FIG. 1 illustrates an example environment of a system that estimates a heading of a target.

FIG. 1 illustrates an example environment 100 of a system implemented on a vehicle 102 such as a truck, that estimates a target heading and navigates based on the estimated target heading. In some embodiments, the vehicle 102 may navigate through roads, streets, and/or terrain with limited or no human input. The word "vehicle" or "vehicles" as used in this paper includes vehicles that travel on ground, such as a truck or bus, but may also include vehicles that travel in air such as drones, airplanes, and helicopters, and vehicles that travel on water such as boats or submarines.

The vehicle 102 may include sensors such as radars 104, 105, 106, and/or 107, Lidar 108, camera 109, GPS, ultrasonic, IMU (inertial measurement unit), FIR (far infrared), sonar, accelerometers, gyroscopes, and magnetometers, for example. Any number of sensors may be operating on the vehicle 102. The vehicle 102 may have installed, or may be connected to a computing system 110 that includes one or more processors and memory. The one or more processors may be configured to perform various operations by interpreting machine-readable instructions. The operations may include processing and/or analysis of the sensor data captured by the aforementioned sensors, or receiving or processing queries associated with a navigation action. The processing or analysis may include, operations of or associated with determining headings of respective one or more targets such as an other vehicle 120. The radars 104, 105, 106, and/or 107 may, in coordination with the computing system 110. Each of the radars 104, 105, 106, and/or 107 may detect Doppler velocities from the other vehicle 120 in a radial direction from the other vehicle 120 to the particular radar 104, 105, 106, or 107. The radars 104, 105, 106, and 107 may determine distances and speeds of objects around the vehicle 102, and may be configured for adaptive cruise control, accident avoidance and blind spot detection. The Lidar 108 may, in coordination with the computing system 110, generate a three-dimensional map of the environment and detect objects. The cameras 109 may, in coordination with the computing system 110, capture and process image data to detect and identify objects, such as road signs, and decipher content of the objects. Such objects may include, but not limited to, pedestrians, road signs such as road markings or lane dividers, traffic lights, and/or other vehicles, for example. In some embodiments, the cameras 109 may recognize, interpret, and analyze road signs such as speed limit, school zone, and construction zone signs and traffic lights. In some embodiments, the cameras 109 may recognize walking movements of pedestrians or people, recognize hand gestures or hand signals from pedestrians such as an upraised hand to indicate that the pedestrian is intending to cross a street.

The vehicle 102 may further include, be connected to, and/or have access to a server 112 which may store sensor data from the vehicle 102, one or more satellite maps, one or more road sensors such as sensors located on traffic lights, and/or from another vehicle. In some embodiments, based on the processed sensor data, the vehicle 102 can adjust vehicle speed based on speed limit signs posted on roadways. The vehicle 102 can also include myriad actuators to propel and navigate the vehicle 102. Such actuators may include, for example, any suitable electro-mechanical devices or systems to control a throttle response, a braking action, or a steering action. For example, the vehicle 102 can maintain a constant, safe distance from a vehicle ahead by constantly adjusting its vehicle speed to that of the vehicle ahead. In general, the vehicle 102 can effectuate any control to itself that a human driver can on a conventional vehicle. For example, the vehicle 102 can accelerate, brake, turn left or right, or drive in a reverse direction just as a human driver can on the conventional vehicle. Moreover, the vehicle 102 can perform more complex operations, such as parallel parking or parking in a crowded parking lot, without any human input.

Figure 2:
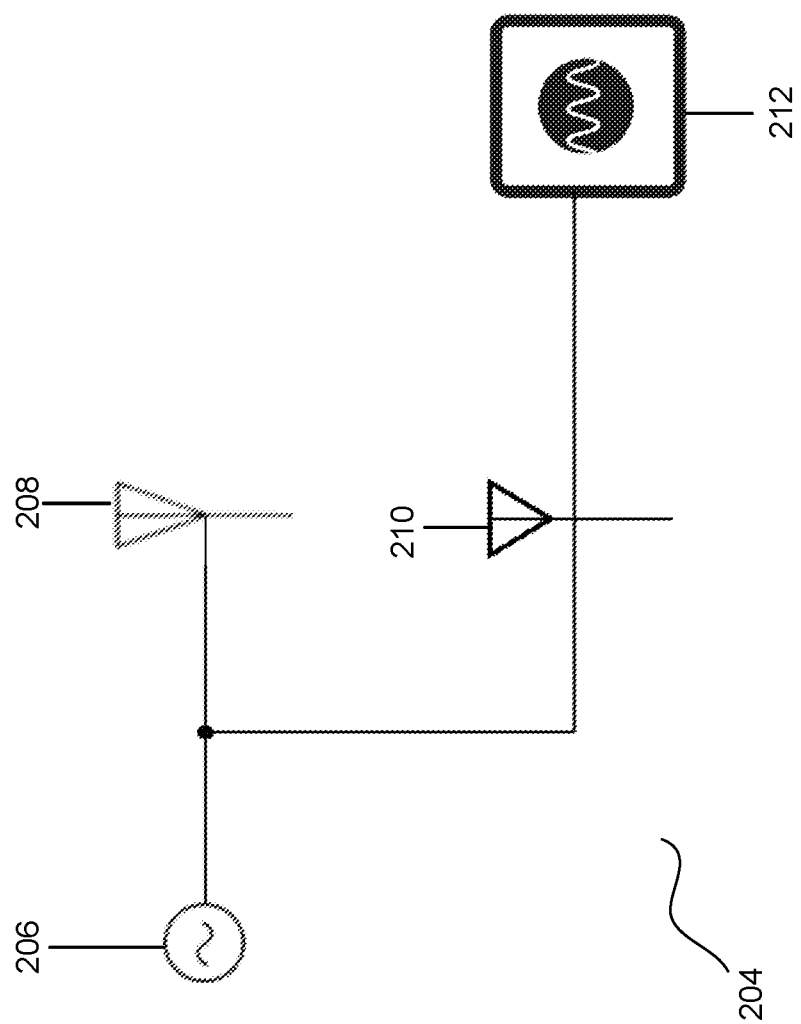
FIG. 2 illustrates an exemplary radar sensor in accordance with the example environment of FIG. 1.

In FIG. 2, an exemplary radar sensor 204, which may be implemented as any of the radars 104, 105, 106, and/or 107 as illustrated in FIG. 1, may include an oscillator 206, a transmitter 208, a receiver 210, and a processor 212. The transmitter 208 and the receiver 210 may each include any number of antennas, which may be any of multi-beam or scanning antennas, planar, lens, or reflector antennas. In some embodiments, the transmitter 208 may have a different number of antennas compared to the receiver 210. The receiver 210 may have more antennas than the transmitter 208. In some embodiments, the oscillator 206 may generate a linear frequency-modulated continuous wave (FMCW) chirp signal, which may be amplified by a power amp. The amplified signal may be transmitted from the transmitter 208. The receiver 210 may receive a mixed signal with the transmitted signal along with a reflected signal, such as a signal reflected from a target. This mixed signal may be processed by the processor 212, for example, by filtering out a sum of the transmitted signal and the reflected signal and digitizing a difference output from the two signals. The processed signal may include radar data indicating spatial positions or coordinates, Doppler velocities and radar cross section values at respective detection points.

Figure 3A:
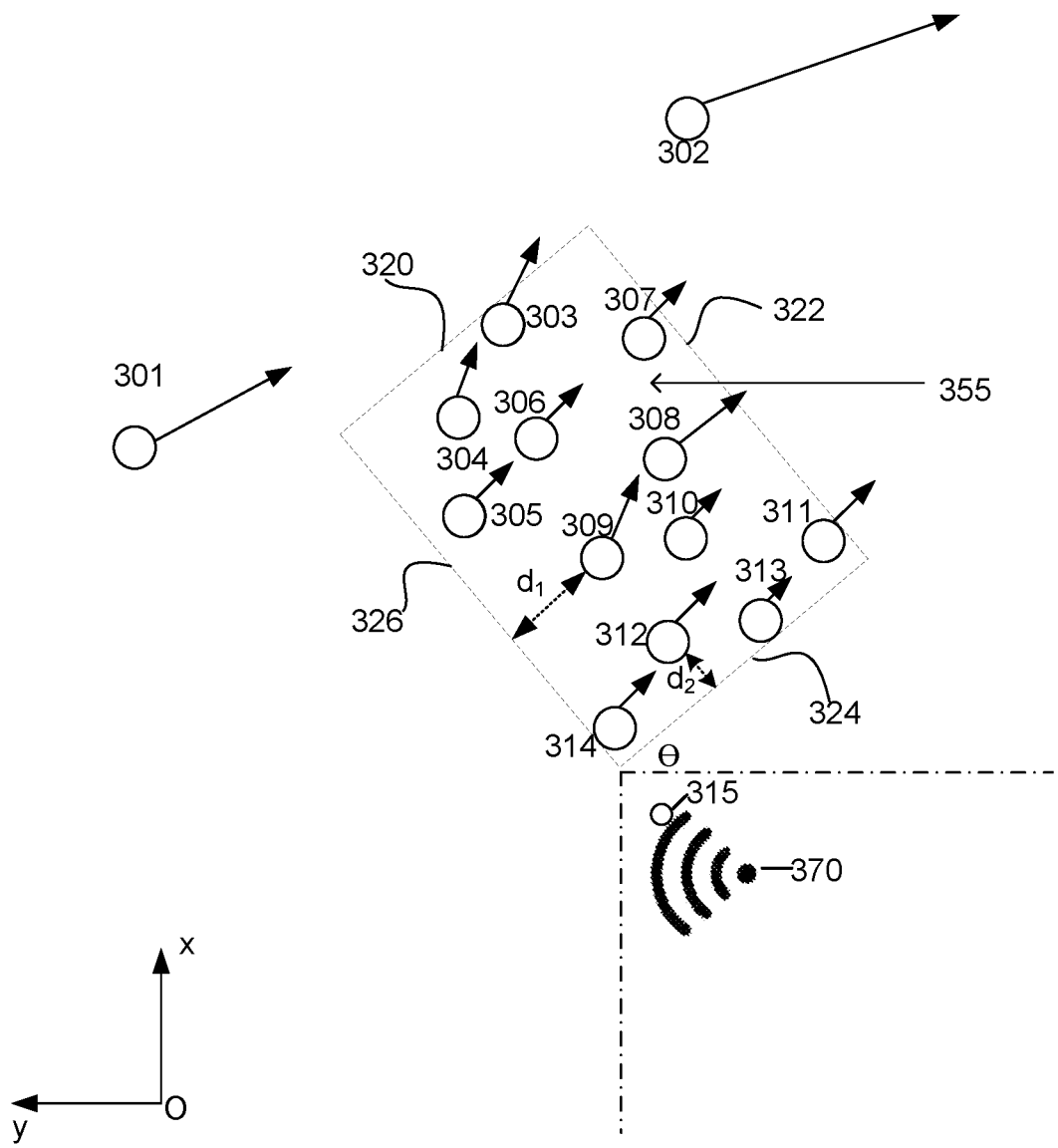
FIG. 3A, FIG. 3B, FIG. 3C, and FIG. 3D illustrate example implementations of the system according to an embodiment of the present disclosure, related to obtaining a heading from processed radar data using a geometric approach.

FIG. 3A illustrates an example implementation of the vehicle system according to an embodiment of the present disclosure, related to obtaining or estimating a heading, heading angle, heading direction, or an orientation (hereinafter referred to as "heading") of the processed radar data using a geometric approach, which may be performed at least in part by one or more processors of the computing system 110 of FIG. 1. First, radar data from only a single frame within a threshold distance of a region may be selected, extracted, or obtained. In some examples, the concentration of data points must satisfy a threshold concentration in order for the data points to be selected or else the data points may be too sparse to be reliable. If the threshold concentration of data points is present in the region, all the data points within the region or within a threshold distance of the region may be selected, extracted, or obtained. The selected, extracted, or obtained data points may correspond or belong to a target such as another vehicle. The geometric approach may be used to obtain or estimate a heading based on a spatial distribution or configuration of the selected or extracted data points. In FIG. 3A, the selected data points may include fourteen different points, designated as points 301 through 314, numbered consecutively. Point 315 may correspond to or indicate a location of a radar sensor 370, which may be implemented as the radar sensor 204 and/or the radars 104, 105, 106, and/or 107. At least some of the points 301 through 314 may have different radar cross section values, which may be accounted for to obtain the heading. In some examples, all the points 301 to 314 may be weighted equally no matter their radar cross section values. In other examples, the points 301 to 314 may be weighted proportionally to their radar cross section values. In some embodiments, a heading may be determined by taking into account all the selected data points or a subset of the selected data points. In some examples, outliers, such as the points 301 and 302, may be identified and removed. Thus, the heading may be estimated or obtained based only on the points 303 to 314, without considering the outliers which include the points 301 and 302.

The estimate $\hat{\theta}_{geom}$ of the heading may be measured or determined with respect to an xy-plane, for example, with respect to an x-axis or a y-axis of the xy-plane. $\hat{\theta}_{geom}$ may be determined using the following Equation (1):

$$\hat{\theta}_{geom} = \mathrm{argmin}_\theta \{\Sigma_{j=1}^N \min_j(\mathrm{dist}(p_i^\theta, b_j))\} \qquad (1).$$

In Equation (1), $p_i^\theta$ is an i-th data point after rotation by an angle of $\theta$ around an origin point (0,0) in the x-y plane; $b_j$ is a j-th boundary of a bounding region, rectangle, or box (hereinafter "bounding box") which is aligned with the x-y axis; $\mathrm{dist}(p_i^\theta, b_j)$ is a distance function which calculates a distance between a given data point and the j-th boundary; N is the number of boundaries, which, in some embodiments, could be either 4 or 6, depending on whether the scenario or situation is 2-D or 3-D. In FIG. 3A, the scenario in which N=4 is described, in a 2-D scenario. In some embodiments, the origin point may correspond to a location of a radar sensor, such as the radar sensor at the point 315. $\hat{\theta}_{geom}$ may be determined as a heading such that a sum of distances between each of the data points and a nearest boundary of a bounding box enclosing the data points is minimized. The heading may be parallel to one boundary of the bounding box. A way to determine $\hat{\theta}_{geom}$ may be determining an angle of rotation of a minimally sized bounding box that fits the points 303 to 314. The bounding box may be initially aligned with or parallel to the x-y axis at zero degrees. As only an illustrative example, $d_1$ as shown in FIG. 3A is a distance between the point 309 and a boundary 326 of a rotated bounding box 325. The boundary 326 may be a nearest boundary to the point 309 because the boundary 326 is closer to the point 309 compared to other boundaries 320, 322, and 324 of the bounding box 325. Meanwhile, $d_2$ is a distance between the point 312 and the boundary 324 of the bounding box 325. The boundary 324 may be a nearest boundary to the point 312 because the boundary 324 is closer to the point 312 compared to other boundaries 320, 322, and 326. Such a procedure as described with respect to the points 309 and 312 having the respective distances $d_1$ and $d_2$ may be applied to the other points 303 to 308, 310, 311, 313, and 314 to determine a distance to a nearest boundary from each of the points 303 to 308, 310, 311, 313, and 314. The sum of the determined distances between each of the points 303 to 314 and a nearest boundary may be obtained using the bounding box 325, which, as shown in FIG. 3A, may be a minimally sized bounding box that encloses all the points 303 to 314. A rotation angle of the bounding box 325 may coincide with, or be used to determine the estimate $\hat{\theta}_{geom}$. Using another bounding box that is not minimally sized, which would not minimize the sum of the determined distances, may yield an inaccurate estimate of $\hat{\theta}_{geom}$. The bounding box 325 may enclose all the points 303 to 314, while each of the boundaries 320, 322, 324, and 326 contacts at least one of the points 303-314, while the other of the points 303 to 314 are situated in an interior of the bounding box 325. For example, the boundary 320 contacts the point 303, the boundary 322 contacts the point 311, the boundary 324 contacts the point 313, and the boundary 326 contacts the points 304 and 314. In other words, at least one point on each of the boundaries 320, 322, 324, and 326 has a coordinate that matches a coordinate or a spatial position of one of the points 303 to 314, or at least, deviates by less than a threshold value.

Figure 3B:
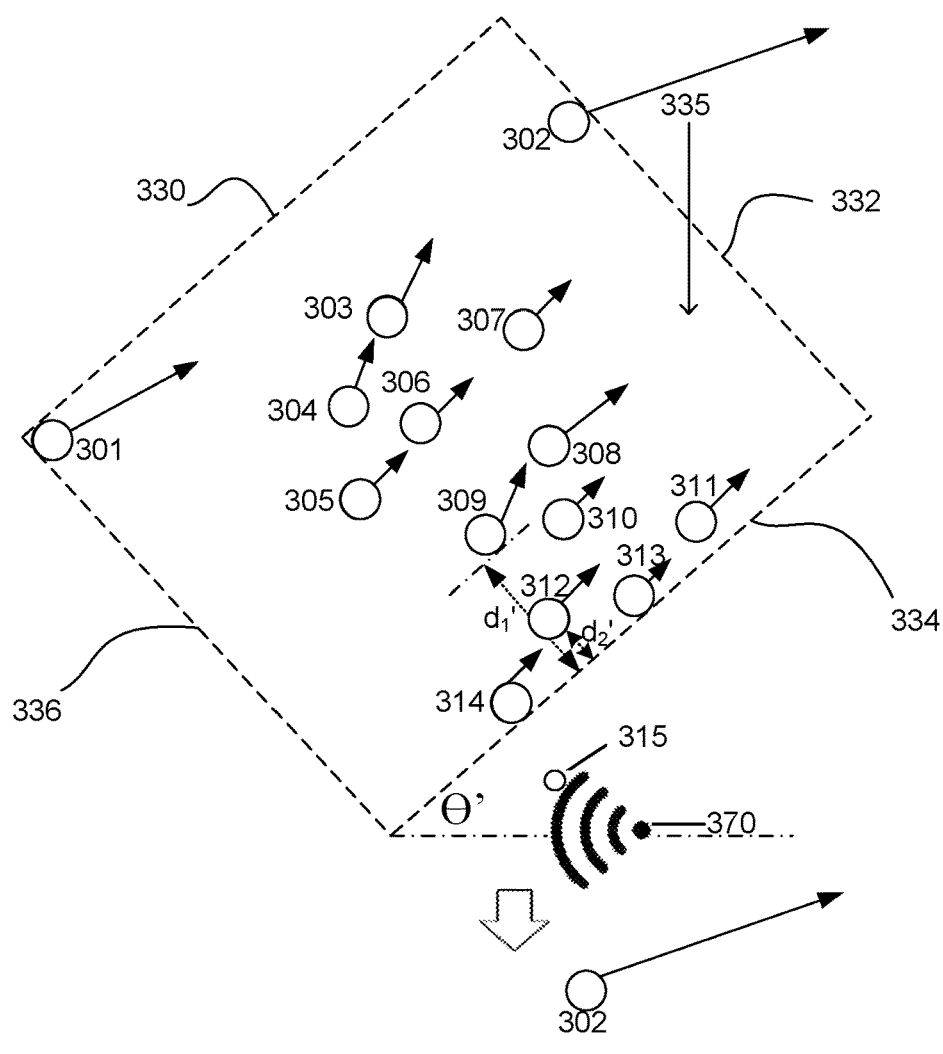
Figure 3B:
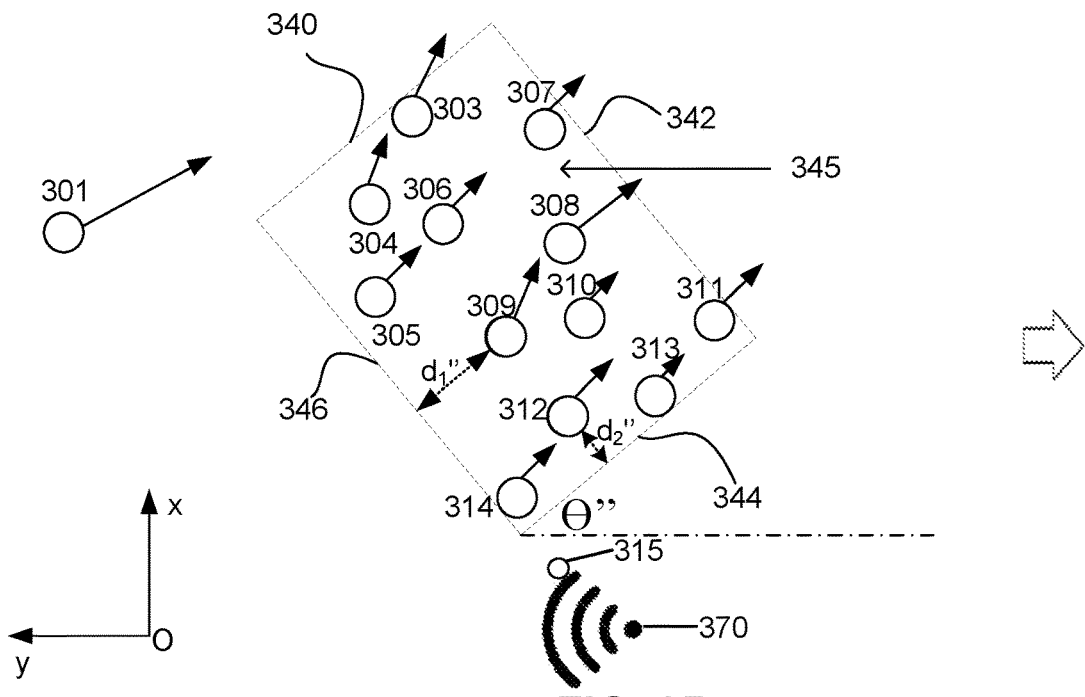
Figure 3B:
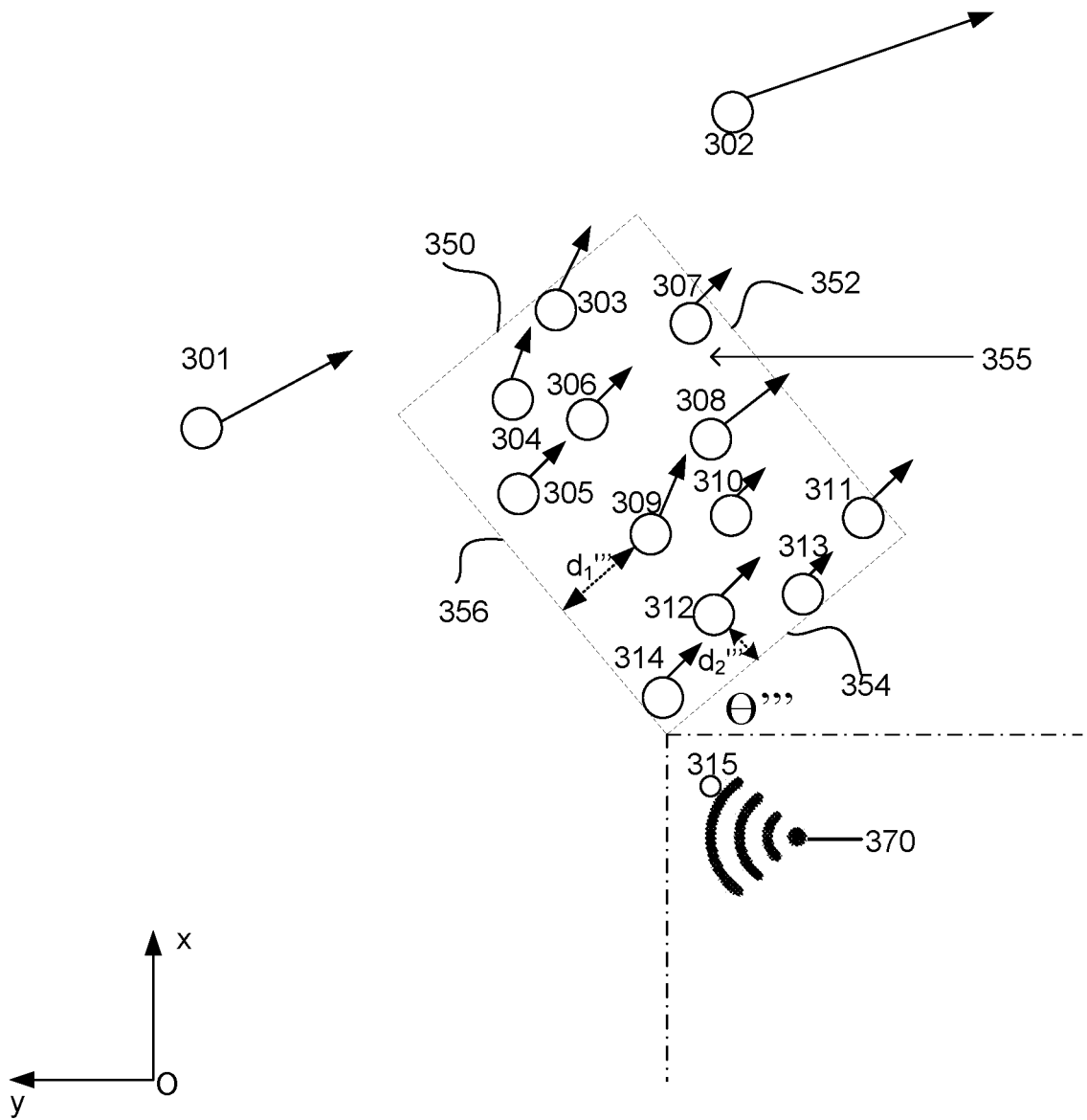

FIG. 3B illustrates a process of determining a heading while identifying and removing outliers. The description in FIG. 3A may also be applicable to FIG. 3B. In some embodiments, as illustrated in FIG. 3B, a potential outlier point may be confirmed or determined as an outlier based on a distance between the potential outlier point and a bounding box enclosing the other selected points excluding the outlier, a change in a determined heading by taking into account all the selected data points compared to a determined heading after removing the potential outlier point, and/or a discrepancy between a Doppler velocity at the potential outlier point and Doppler velocities at any or all of the other respective selected points. In FIG. 3B, initially, a heading $\theta'$ may be determined by taking into account all the selected data points 301-314 without removing any of the selected data points 301-314 as outliers. $\theta'$ may be measured with respect to an xy-plane. $\theta'$ may be determined using the same Equation (1) as described above with respect to FIG. 3A:

$$\theta' = \mathrm{argmin}_\theta \{\Sigma_{j=1}^N \min_j(\mathrm{dist}(p_i^\theta, b_j))\} \quad (1).$$

$d_1'$, as shown in FIG. 3B, is a distance between the point 309 and a boundary 334 of a bounding box 335, which may be a minimally sized bounding box that encloses all the points 301 to 314. The boundary 334 may be a nearest boundary to the point 309 because the boundary 334 is closer to the point 309 compared to other boundaries 330, 332, and 336 of the bounding box 335. Meanwhile, $d_2'$ is a distance between the point 312 and the boundary 334 of the bounding box 335. The boundary 334 may be a nearest boundary to the point 312 because the boundary 334 is closer to the point 312 compared to the other boundaries 330, 332, and 336. Such a procedure as described with respect to the points 309 and 312 having the respective distances $d_1'$ and $d_2'$ may be applied to the other points to determine a distance between each of the points 301 to 308, 310, 311, 313, and 314, and a nearest boundary. The sum of the determined distances between each of the points 303 to 314 and a nearest boundary may be obtained using the bounding box 335, which, as shown in FIG. 3B, may be a minimally sized bounding box that encloses all the points 303 to 314.

In FIG. 3B, any of the points 301 to 314 determined to be outliers may be removed, for example, point-by-point, sequentially, or iteratively. In particular, an updated orientation may be determined or computed according to the process described above, including Equation 1, after removing one of the points. A potential outlier point may be selected or determined from one of the points 301 to 314. A potential outlier point may be identified by determining that removing that potential outlier point would result in a greater change in a heading compared to a scenario in which any one of the other points were removed, or if such a change is greater than a threshold heading. For example, the point 301 may be selected as a potential outlier point. After excluding the point 301, an updated heading $\theta''$ and an updated bounding box 345 having updated boundaries 340, 342, 344, and 346 may be determined. An updated distance $d_1''$ between the point 309 and the updated boundary 346, and an updated distance $d_2''$ between the point 312 and the updated boundary 344 may be determined. In some examples, due to the updated bounding box 345, a nearest boundary to one of the points 302 to 314 may have changed compared to the bounding box 335. For example, previously, the nearest boundary to the point 309 was the boundary 334 with respect to the bounding box 335 but the updated nearest boundary to the point 309 may be the boundary 346 rather than the boundary 344 with respect to the bounding box 345.

The difference between the updated heading $\theta''$ and the heading $\theta'$ may indicate a change in an estimated heading as a result of removing the point 301. A criteria of determining whether the point 301 is an outlier may include any one or more of an amount of change between the updated heading $\theta''$ and the heading $\theta'$, a distance between the point 301 and the updated bounding box 345, or a distance between the point 301 and any of the updated boundaries 340, 342, 344, and 346, and/or a difference between a Doppler velocity at the point 301 and Doppler velocities at the points 302 to 314. Other criteria of determining whether the point 301 is an outlier may include determining a context of the point 301 based on historical data. For example, if, from a previous cycle, the point 301 was determined to correspond to a building, a construction site, or another location in which a vehicle cannot be driven or parked, or otherwise determined to be an outlier, the point 301 may be determined or classified to be an outlier in a current cycle. Here, the point 301 may be determined to be an outlier and thus may be removed so that the updated bounding box 345 and the updated heading $\theta''$ do not take into account the point 301.

Additional outliers may be identified, such as the point 302, which may have a larger impact on the heading compared to other points 303 to 314, meaning that removing the point 302 may result in a greater change in a heading compared to a scenario in which any one of the other points 303 to 314 were removed. After excluding the point 302, one or more processors of the computing system 110 may determine a second updated heading $\theta'''$ and a second updated bounding box 355 having second updated boundaries 350, 352, 354, and 356, similar to the procedure described above. A second updated distance $d_1'''$ may be determined between the point 309 and the second updated boundary 356, and a second updated distance $d_2'''$ may be determined between the point 312 and the second updated boundary 354. The difference between the second updated heading $\theta'''$ and the updated heading $\theta''$ may indicate a change in an estimated heading as a result of removing the point 302, and the difference between the updated heading $\theta'''$ and the heading $\theta'$ may be a change in a determined heading as a result of removing both of the points 301 and 302. As described with respect to the point 301 above, a criteria of determining whether the point 302 is an outlier may include any one or more of an amount of change between the second updated heading $\theta'''$ and the updated heading $\theta''$, a distance between the point 302 and the second updated bounding box 355, or between the point 302 and any of the second updated boundaries 350, 352, 354, and 356, and/or a difference between a Doppler velocity at the point 302 and Doppler velocities at the points 303 to 314. After the point 302 is determined to be an outlier, and none of the points 303 to 314 are determined to be outliers, an estimate $\hat{\theta}_{geom}$ of the heading may be determined or estimated to be $\theta'''$. One or more processors of the computing system 110 may determine no additional outliers to be present if the heading based on a subset of the points 303 to 314 converges, even if more points are removed from the remaining points. In some embodiments, multiple outlier points may be removed in a single iteration or at once.

In some embodiments, outliers may additionally or alternatively be identified using a deep neural network, such as a convolutional neural network (CNN) to classify each of the points 301 to 314 based on the Doppler velocities and/or based on ground truth information. For example, any of the points 301 to 314 may be classified as a pedestrian, car, truck, vehicle, cyclist, static object, or other object. The deep neural network may output a binary classification, which may be a prediction of whether or not each of the points 301 to 314 belongs to a particular classification, or multi-label, in which the deep neural network outputs a score indicating a probability that each of the points 301 to 314 belongs to one or more of the particular classifications. If a majority of the points 301 to 314 are classified as vehicles, any of the points 301 to 314 having a predicted classification other than a vehicle may be identified as an outlier.

Figure 3C:
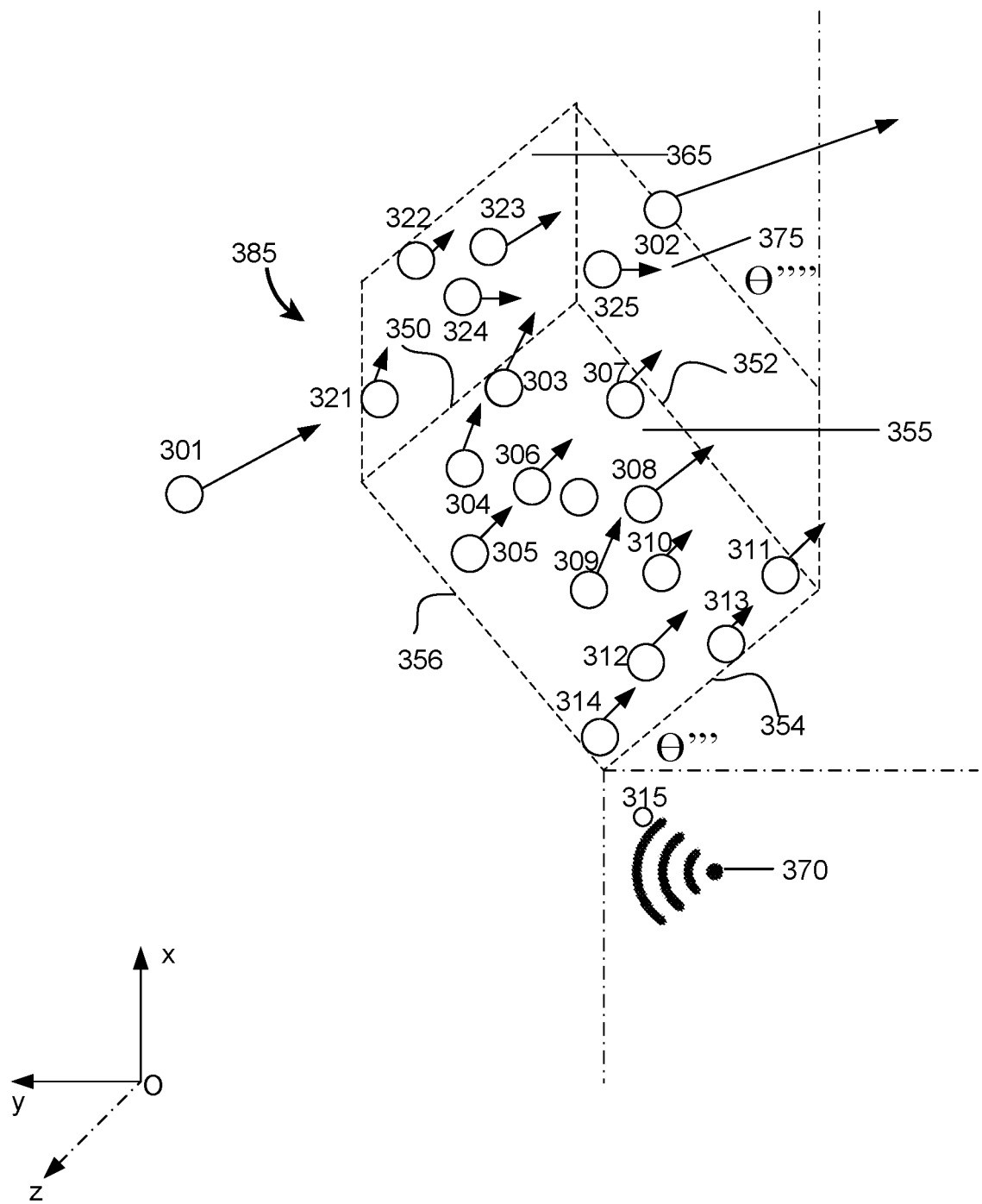

In some embodiments, as shown in FIG. 3C, a different bounding region may be selected instead of the second updated bounding box 355. For example, the second updated bounding box 355 may be substituted with another bounding region such as a 3-D bounding region 385, for example, if the radar data further includes points such as points 321 to 325 that extend into a z-direction, perpendicular to the plane of the points 301 to 314. That is, instead of determining a heading based in part on measuring a distance from a subset of the points 301 to 314 to a nearest boundary of a 2-D bounding box or bounding rectangle, a distance from the subset of the points 301 to 314 and 321 to 325 may be measured with respect to a nearest plane or surface of a 3-D boundary region, in order to determine the minimum 3-D bounding region 385 that encloses the non-outliers out of points 301 to 314 and 321 to 325. For example, the data points 321 to 324 may be closest to a surface 365, the data point 325 may be closest to a surface 375, and the data points 303 to 314 may be closest to or on the surface 355. The estimated heading may be determined by an angle $\theta'''$, which may be measured as an angle between the surface 365 and a y-z plane, and at least an another angle $\theta''''$, which may be measured between the surface 364 and a x-z plane.

Figure 3D:
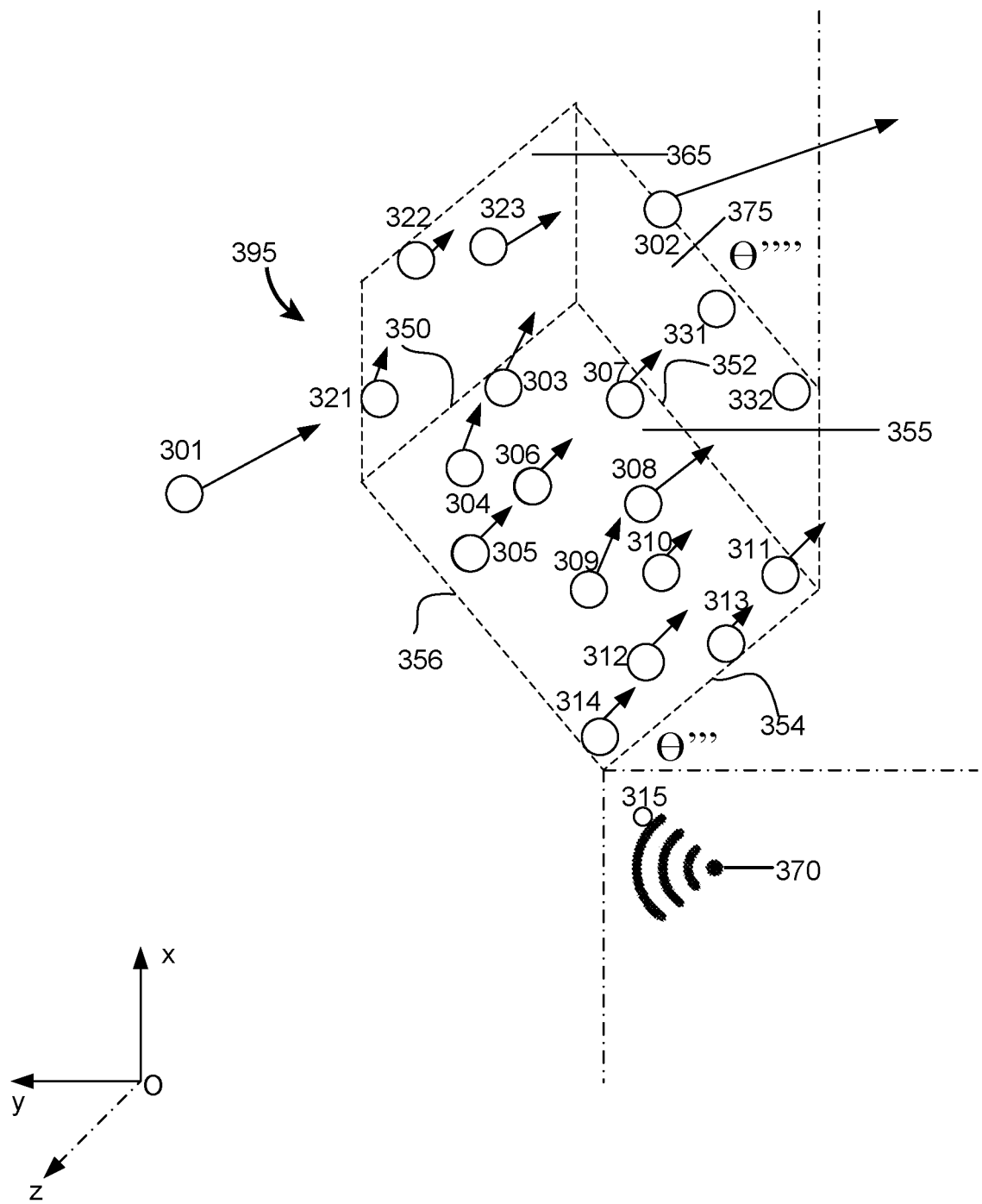

In some embodiments, as shown in FIG. 3D, if the radar data points 301 to 314 are only oriented in two dimensions such as along the x-y plane, and/or a number of non-outlier data points such as the points 321 to 323 in a third dimension is less than a threshold, the radar data points 301 to 314 and/or 321 to 323 may be fused with additional selected 3-D points, such as points 331 and 332, which may be disposed in an orthogonal direction to and/or not disposed in a plane on which the radar data points 301 to 314 are situated. Thus, radar data points in two dimensions or three dimensions may be supplemented by additional points oriented or extending in the third dimension, the additional points being from sensors of other modalities. In some examples, the selected 3-D points may be from camera data and/or a 3-D point cloud captured at a same time and/or during a same frame, and/or have been synchronized with the radar data points 301 to 314. In some embodiments, the selected 3-D points may have undergone a denoising process. In some examples, the selected 3-D points may additionally, when projected into a normal direction of the x-y plane, fall within the second updated bounding box or surface 355. In some embodiments, if the selected 3-D points do not fall within the second updated bounding box or surface 355, they may not be considered. In some embodiments, data of different modalities may be fed into different neural networks. In other embodiments, a CNN network may process the fusion of the selected 3-D points with the 2-D data points. Thus, in such a CNN network, the data from different modalities may be fed into the same CNN network. In some examples, no additional calibration between the radar and the camera and/or Lidar may be required because the CNN may implicitly learn the coordinate mapping between the radar and the camera and/or Lidar. In other examples, additional calibration between the radar and the camera and/or Lidar may be required. In some examples, the 3-D point cloud may be converted into a 2-D point map, a depth image, a horizontal disparity, height above ground, and angle with gravity (HHA) encoded image, or other format, prior to fusion. A CNN network such as a multi-stage CNN network may be used to obtain a 3-D bounding box from the 3-D points by regression and classification of the 3-D points and model fitting to an existing vehicle model, such as a truck model. For example, a first CNN may output the 3-D bounding box. A second CNN may output a probability indicating how likely each of the points represent an actual vehicle or truck. A veracity of the 3-D bounding box may further be checked by determining whether one surface of the 3-D bounding box is parallel to a surface of a road. The surface of the road may be determined by one or more modalities such as Lidar. If all surfaces of the 3-D bounding box deviate from the determined surface of the road, the 3-D bounding box may be determined to be invalid and recomputed.

Figure 4:
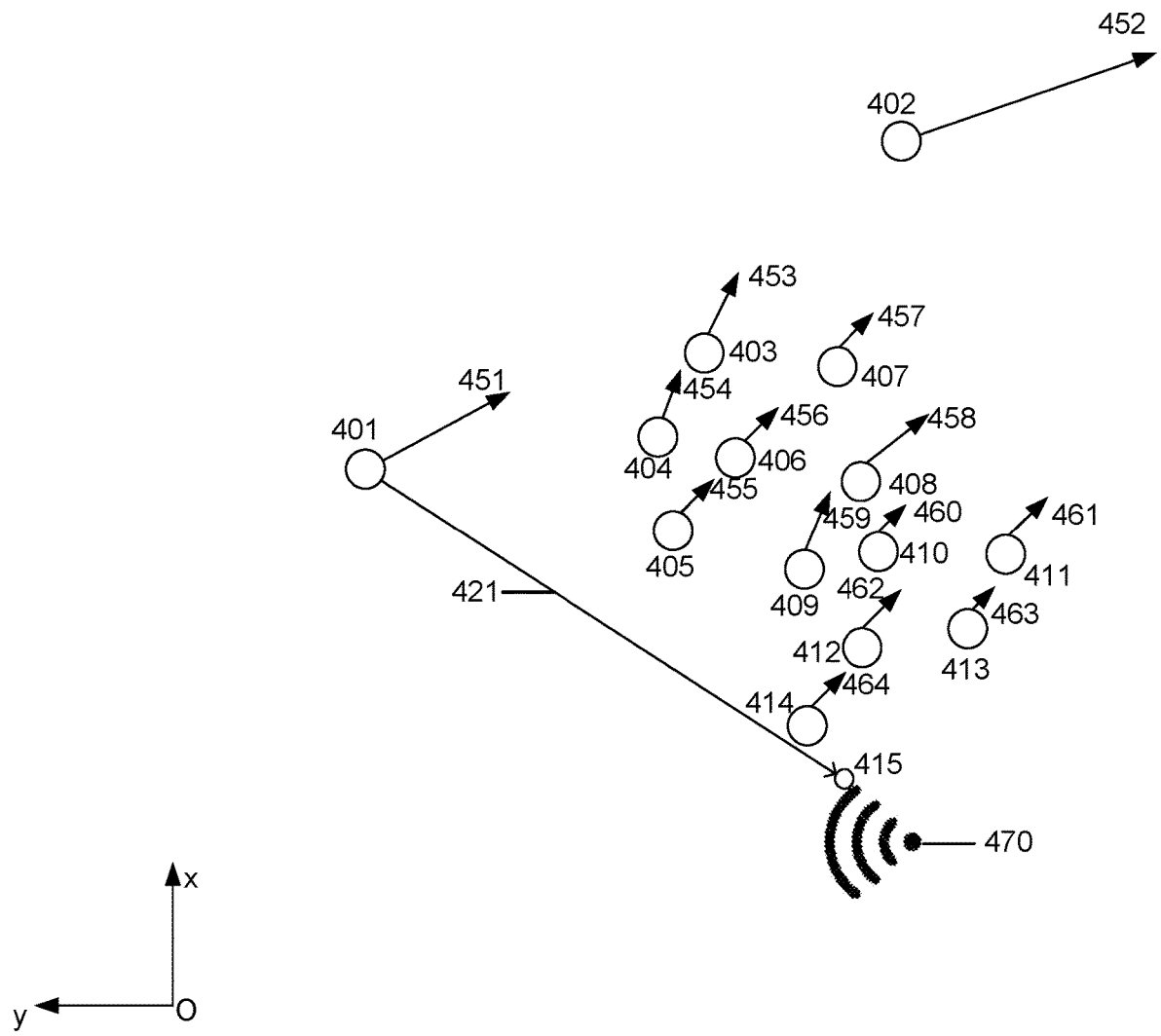
FIG. 4 illustrates an example implementation of the system according to an embodiment of the present disclosure, related to obtaining a heading from processed radar data using a Doppler approach.

After obtaining a heading of a target using a geometric approach as illustrated with respect to FIG. 3A, FIG. 3B, FIG. 3C, and/or FIG. 3D, in parallel with or prior to the geometric approach, one or more processors of the computing system 110 may obtain a heading of the target using a Doppler approach, as illustrated in FIG. 4. The Doppler approach may be fused with the geometric approach and further be a sanity check of the geometric approach. In some embodiments, outliers identified in the geometric approach may also be removed from consideration in the Doppler approach, and vice versa. In some embodiments, outliers are identified separately in the geometric approach and in the Doppler approach. In particular, the Doppler approach may be formulated by a least-squares problem with the following Equation (2):

$$P\underline{v} = \underline{v}_g \qquad (2).$$

The goal is to estimate $\underline{v}$, a velocity vector, of a target represented by a subset of radar data points including a portion or all of 401 to 414. In some examples, the radar data points 401 to 414 may correspond to the points 301 to 314 illustrated in FIG. 3A, FIG. 3B, FIG. 3C, and FIG. 3D.

In Equation 2, P is a projection matrix that represents a radial direction between each of the subset of the radar data points 401 to 414, and a radar sensor 470 located at an origin point 415. In some embodiments, the radar sensor 470 may be implemented as any of the radars 104, 105, 106, or 107, and/or the radar sensor 370. The projection matrix P may be denoted as follows:

$$\begin{bmatrix} P_{x1} & P_{y1} \\ P_{x2} & P_{y2} \\ P_{x3} & P_{y3} \\ P_{x4} & P_{y4} \\ P_{x5} & P_{y5} \\ P_{x6} & P_{y6} \\ P_{x7} & P_{y7} \\ P_{x8} & P_{y8} \\ P_{x9} & P_{y9} \\ P_{x10} & P_{y10} \\ P_{x11} & P_{y11} \\ P_{x12} & P_{y12} \\ P_{x13} & P_{y13} \\ P_{x14} & P_{y14} \end{bmatrix}$$

Here, $[P_{x1}, P_{y1}]$ from may be a direction the point 401 to the radar sensor 470 as indicated by the arrow 421; $[P_{x2}, P_{y2}]$ may be a direction from the point 402 to the radar sensor 470; $[P_{x3}, P_{y3}]$ may be a direction from the point 403 to the radar sensor 470; $[P_{x4}, P_{y4}]$ may be a direction from the point 404 to the radar sensor 470; [$P_{x5}$, $P_{y5}$] may be a direction from the point 405 to the radar sensor 470; [$P_{x6}$, $P_{y6}$] may be a direction from the point 406 to the radar sensor 470; [$P_{x7}$, $P_{y7}$] may be a direction from the point 407 to the radar sensor 470; [$P_{x8}$, $P_{y8}$] may be a direction from the point 408 to the radar sensor 470; [$P_{x9}$, $P_{y9}$] may be a direction from the point 409 to the radar sensor 470; [$P_{x10}$, $P_{y10}$] may be a direction from the point 410 to the radar sensor 470; [$P_{x11}$, $P_{y11}$] may be a direction from the point 411 to the radar sensor 470; [$P_{x12}$, $P_{y12}$] may be a direction from the point 412 to the radar sensor 470; [$P_{x13}$, $P_{y13}$] may be a direction from the point 413 to the radar sensor 470; [$P_{x14}$, $P_{y14}$] may be a direction from the point 414 to the radar sensor 470. Thus, the projection matrix P is a k by 2 matrix in a two-dimensional scenario, k being a number of the radar data points. In some embodiments, the projection matrix P may exclude outlier points, such as, for example, radar data points 401 and 402, and thus, P may not include the elements $P_{x1}$, $P_{y1}$, $P_{x2}$, and $P_{y2}$. Only the arrow 421 is shown in FIG. 4 for the sake of clarity. Arrows may extend from each of the points 401 to 414 to the radar sensor 470.

In some embodiments, outliers may additionally or alternatively be identified or classified based on the directions from the points 401 to 414 to the radar sensor 470, and/or based on range and azimuth dimensions. In some embodiments, such an identification or classification process may take place on a different fully connected layer on a CNN from the identification or classification based on the Doppler velocities and based on ground truth information.

$\underline{v}_g$ is a k by 1 vector of ground doppler speed for the k radar data points. $\underline{v}_g$ may be denoted as follows:

$$\begin{bmatrix} v_{g1} \\ v_{g2} \\ v_{g3} \\ v_{g4} \\ v_{g5} \\ v_{g6} \\ v_{g7} \\ v_{g8} \\ v_{g9} \\ v_{g10} \\ v_{g11} \\ v_{g12} \\ v_{g13} \\ v_{g14} \end{bmatrix}$$

Here, $v_{g1}$ may be a magnitude of a Doppler velocity 451 measured at the point 401; $v_{g1}$ may be a magnitude of a Doppler velocity 452 measured at the point 402; $v_{g3}$ may be a magnitude of a Doppler velocity 453 measured at the point 403; $v_{g4}$ may be a magnitude of a Doppler velocity 454 measured at the point 404; $v_{g5}$ may be a magnitude of a Doppler velocity 455 measured at the point 405; $v_{g6}$ may be a magnitude of a Doppler velocity 456 measured at the point 406; $v_{g7}$ may be a magnitude of a Doppler velocity 457 measured at the point 407; $v_{g8}$ may be a magnitude of a Doppler velocity 458 measured at the point 408; $v_{g9}$ may be a magnitude of a Doppler velocity 459 measured at the point 409; $v_{g10}$ may be a magnitude of a Doppler velocity 460 measured at the point 410; $v_{g11}$ may be a magnitude of a Doppler velocity 461 measured at the point 411; $v_{g12}$ may be a magnitude of a Doppler velocity 462 measured at the point 412; $v_{g13}$ may be a magnitude of a Doppler velocity 463 measured at the point 413; $v_{g14}$ may be a magnitude of a Doppler velocity 464 measured at the point 414. In some embodiments, the points 401 and 402 may be removed as outliers and the vector 12 may not include the elements $v_{g1}$ and $v_{g2}$.

$\underline{v}$ is denoted as $[\underline{v}_x, \underline{v}_y]^T$. Equation (2) may be rewritten as Equation (3) to obtain an estimate $\hat{v}$ of the velocity vector $\underline{v}$:

$$\hat{v} = \text{pinv}(P)\underline{v}_g \quad (3).$$

In other words, a Moore-Penrose inverse of the matrix P may be multiplied by the vector $\underline{v}_g$ to obtain the estimate $\hat{v}$, which may be denoted as $[\hat{v}_x, \hat{v}_y]^T$. A heading $\hat{\theta}_{dopp}$ of the target may be derived based on, or using, Equation (4) below:

$$\hat{\theta}_{dopp} = \arctan\left(\frac{\hat{v}_x}{\hat{v}_y}\right). \quad (4)$$

Described above is a 2-D scenario. The above descriptions may be extended to a 3-D scenario. The differences of the 3-D scenario would be that a 3-D bounding region replaces a 2-D bounding region in Equation (1), and a sum of distances is obtained from each of the points to a nearest face or surface rather than a nearest boundary line, as shown in FIG. 3C and FIG. 3D. Additionally, Equations (2) through (4) may be extended to three dimensions by including a z-coordinate. In particular, the projection matrix P may be denoted as follows:

$$\begin{bmatrix} P_{x1} & P_{y1} & P_{z1} \\ P_{x2} & P_{y2} & P_{z2} \\ P_{x3} & P_{y3} & P_{z3} \\ P_{x4} & P_{y4} & P_{z4} \\ P_{x5} & P_{y5} & P_{z5} \\ P_{x6} & P_{y6} & P_{z6} \\ P_{x7} & P_{y7} & P_{z7} \\ P_{x8} & P_{y8} & P_{z8} \\ P_{x9} & P_{y9} & P_{z9} \\ P_{x10} & P_{y10} & P_{z10} \\ P_{x11} & P_{y11} & P_{z11} \\ P_{x12} & P_{y12} & P_{z12} \\ P_{x13} & P_{y13} & P_{z13} \\ P_{x14} & P_{y14} & P_{z14} \end{bmatrix}$$

$\underline{v}$ may be denoted as $[\underline{v}_x, \underline{v}_y, \underline{v}_z]^T$.

Equation (5) may additionally describe a 3-D heading $\hat{\theta}_{doppz}$ with respect to a z-axis:

$$\hat{\theta}_{doppz} = \arctan\left(\frac{\hat{v}_z}{\hat{v}_{x-y}}\right). \quad (5)$$

$\hat{v}_z$ is a velocity component in a z direction and $\hat{v}_{x-y}$ is a velocity component in an x-y plane.

Figure 5A:
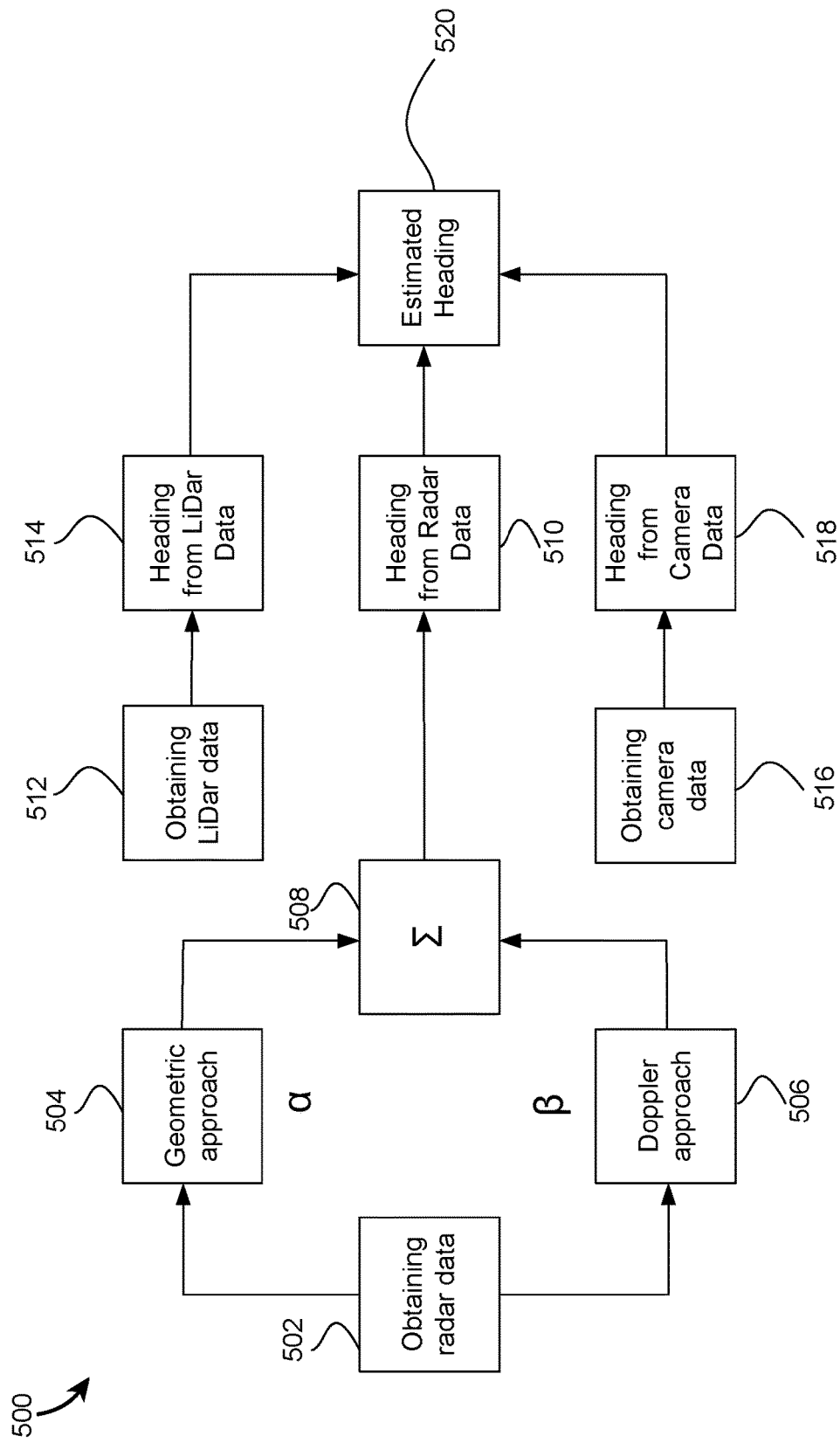
FIG. 5A illustrates a diagram of combining the geometric approach as described with respect to FIG. 3A and FIG. 3B, FIG. 3C, and FIG. 3D, and the Doppler approach as described with respect to FIG. 4.

FIG. 5A shows a diagram of combining the geometric approach as described with respect to FIG. 3A, FIG. 3B, FIG. 3C, and FIG. 3D, and the Doppler approach as described with respect to FIG. 4, as performed, for example, by one or more processors of the computing system 110. In step 502, radar data corresponding to a target may be obtained at different points or coordinates using a radar sensor, such as the radar sensor 470 or any of the radars 104, 105, 106, or 107. From the obtained radar data, a geometric approach may be used to obtain a first estimate of a heading of the target in step 504 and a Doppler approach may be used to obtain a second estimate of a heading of the target in step 506. As illustrated in FIG. 5A, the geometric approach and the Doppler approach may be performed in parallel. However, in some embodiments, the geometric approach and the Doppler approach may be performed in series. For example, the geometric approach may be performed first, followed by the Doppler approach. In step 508, a weighted sum of the first estimate and the second estimate may be obtained. The weighted sum may be obtained using the following Equation 6:

$$\hat{\theta}_{comb} = \alpha\hat{\theta}_{geom} + \beta\hat{\theta}_{dopp}, \alpha+\beta=1 \qquad (6).$$

Coefficients $\alpha$ and $\beta$ indicate respective weights of the geometric approach and the Doppler approach and may be adjusted based on a variance of the $\hat{\theta}_{comb}$, for example, obtained over different cycles or over the different points. In some examples, the coefficients $\alpha$ and $\beta$ may be selected to minimize a variance of the combined estimation $\hat{\theta}_{comb}$. In some embodiments, $\alpha$ and $\beta$ may be obtained using a machine learning model, which incorporates historical data of previously determined values of $\alpha$ and $\beta$ during a previous cycle and/or during a previously obtained bounding box at a same location or a location within a threshold distance of the current bounding box. Inputs used to train the machine learning model may include data from a previous cycle such as location coordinates, visibility conditions, and/or weather conditions. The outputs of the machine learning model may include the previously determined values of $\alpha$ and $\beta$. By using this machine learning model, a computation or processing time of one or more processors of the computing system 110 may be reduced. Additionally, if current conditions such as weather conditions compromise an accuracy of either the geometric approach or the Doppler approach, a reliable estimate of the heading of the target may still be obtained using previous data obtained under same or similar conditions.

Figure 5B:
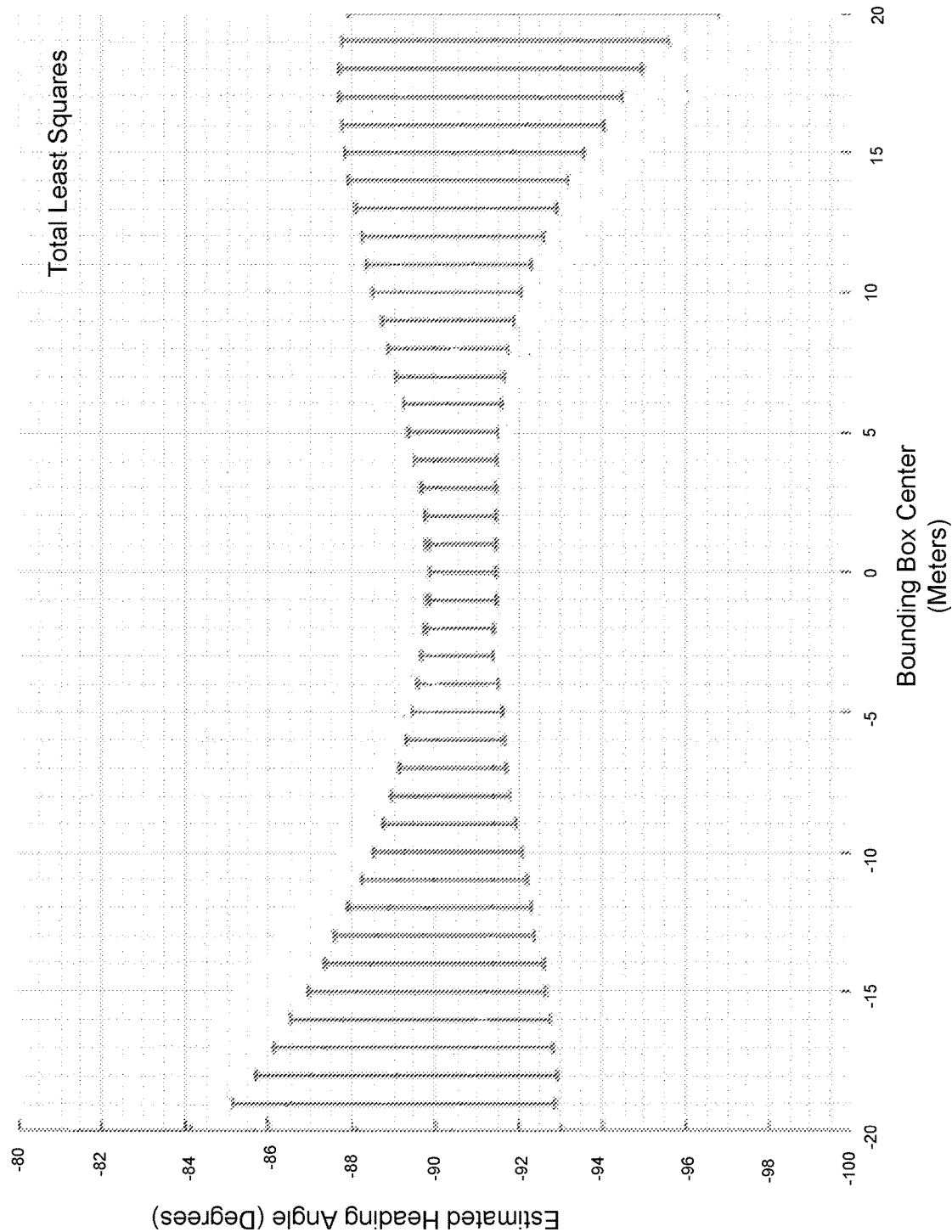
FIG. 5B illustrates a simulation of an estimated heading, in accordance with FIG. 5A.
Figure 5B:
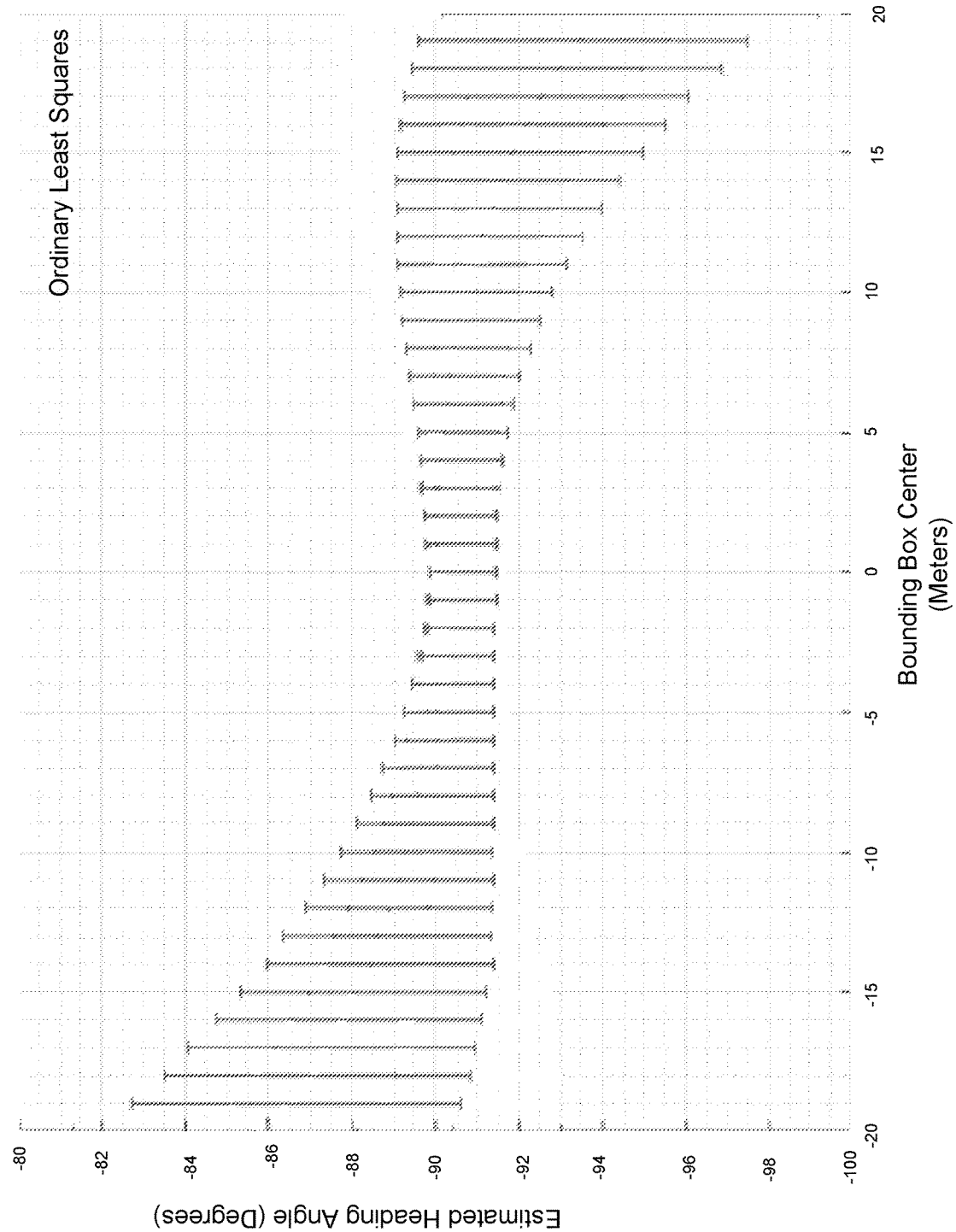

In step 510, the estimated heading of the target may be obtained by the weighted sum from step 508. FIG. 5B illustrates a simulation, based on total least squares (TLS) and ordinary least squares (OLS) of an estimated heading of 90 degrees of a cross moving target according to step 510.

Back to FIG. 5A, in step 512, in an independent pathway, Lidar data may be obtained at or near a location of the radar data, for example, within a threshold distance of one or more coordinates of the radar data. In step 514, the heading of the target may be estimated based on a distribution or configuration of a subset of the obtained Lidar data. In step 516, in another independent pathway, camera data may be obtained at or near a location of the radar data, for example, within a threshold distance of one or more coordinates of the radar data. In step 518, the heading of the target may be estimated based on a distribution or configuration of a subset of the obtained Lidar data. The estimates of the heading from the radar data, the Lidar data, and the camera data may be compared. If all the estimates are within threshold values of one another, the estimates may be combined or fused to obtain an overall estimated heading in step 520.

In some embodiments, a second bounding box may be obtained based on the Lidar data and/or a third bounding box may be obtained based on the camera data. The bounding box obtained from the radar data, the second bounding box, and/or the third bounding box may be compared with one another to determine whether any remaining outliers exist within the aforementioned bounding boxes. For example, if the bounding box obtained from the radar data includes a data point that is outside the second bounding box and the third bounding box, the data point may be a potential outlier. Other criteria such as that described with respect to FIG. 3B may be used to determine whether the potential outlier is actually an outlier.

If the estimated heading from one of the Lidar data, the radar data, or the camera data deviates from the other estimated headings by more than a threshold value, that estimated heading may not be combined or fused with the other estimated headings. Analysis may be conducted to determine whether that estimated heading is inaccurate and/or whether a sensor on which the estimated heading was based is defective or uncalibrated, for example, by one or more processors of the computing system 110. In some embodiments, if one set of measurements has been determined to be unreliable, for example, if radar data is obtained in a tunnel, that set of measurements may be disregarded or decreased in weight.

Figure 6:
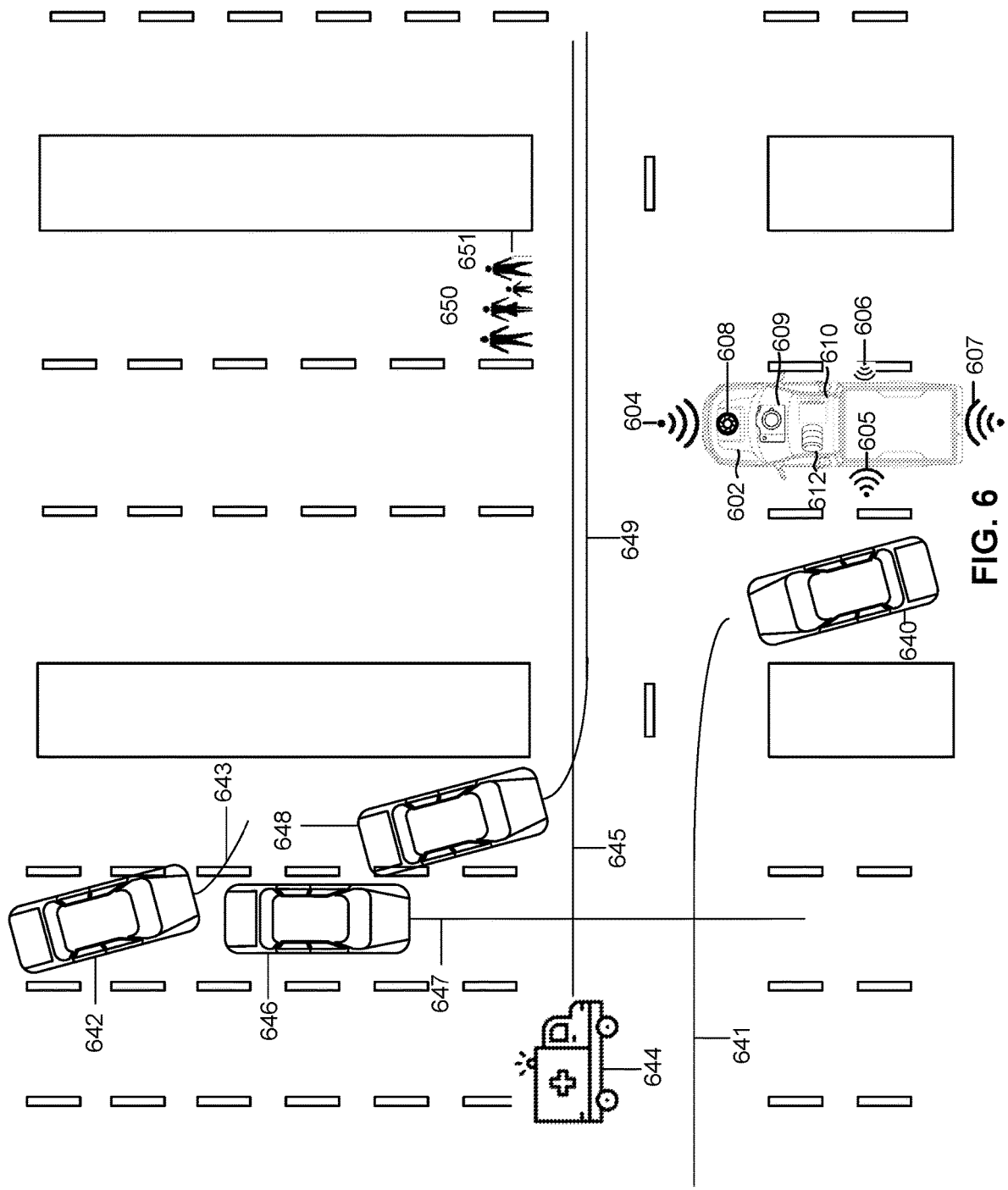
FIG. 6 illustrates an example implementation of the system.

In FIG. 6, a vehicle 602, which may be implemented as the vehicle 102 of FIG. 1, may estimate respective target headings of different vehicles and/or pedestrians according to the previous description. The vehicle 602 may include installed sensors including radars 604, 605, 606, and/or 607, Lidar 608, camera 609, GPS, ultrasonic, IMU (inertial measurement unit), FIR (far infrared), sonar, accelerometers, gyroscopes, and magnetometers, for example. Any number of sensors may be operating on the vehicle 602. The vehicle 602 may have installed in it, or may be connected to a computing system 610 that includes one or more processors and memory. The vehicle 602 may further have, be connected with, and/or have access to a server 612 which may store sensor data from the vehicle 602, one or more satellite maps, one or more road sensors such as sensors located on traffic lights, and/or from another vehicle.

One or more processors of the computing system 610 may infer intentions of targets as indicated by estimated or predicted trajectories based on respective estimated headings of each target. For example, the computing system 610 may estimate that a vehicle 640 may have a predicted trajectory 641 and intend to turn, a vehicle 642 may have a predicted trajectory 643 and intend to change a lane, an emergency vehicle 644 may have a predicted trajectory 645 and intend to go straight, a vehicle 646 may have a predicted trajectory 647 and intend to go straight, a vehicle 648 may have a predicted trajectory 649 and intend to turn, and pedestrians 650 may have a predicted trajectory 651 and intend to move toward a sidewalk. Even though some of the targets, such as the vehicle 642, may be partially obscured, the computing system 610 may still determine an estimated heading, inferred intention, and an estimated trajectory. In some embodiments, the inference of intentions may be based on a comparison of an estimated heading of a target with an orientation of a road or lane on which the target is driving. For example, if the estimated heading matches closely with the orientation of the road or the lane, the inferred intention may be that the target is going straight. As another example, if the estimated heading deviates from the orientation of the road or the lane, the inferred intention may be that the target is changing lanes, turning, or u-turning, depending on how far the target is from an intersection and an amount of deviation between the estimated heading and the orientation of the road or lane. An intention may also be inferred, or a predicted trajectory may be determined, based on a current lane that the target is travelling on, a traffic density and/or a traffic distribution, a type of target such as whether the vehicle is an emergency or authority vehicle, and/or a road condition. In some embodiments, the inference of intentions and/or the estimation of trajectories may be conducted using a machine learning model. Such a machine learning model may be trained from training examples with inputs of heading or estimated heading of a target, an orientation of a road and/or lane, a distance away from an intersection, a current lane that the target is travelling on, a traffic density and/or a traffic distribution, a type of target such as whether the vehicle is an emergency or authority vehicle, and/or a road condition, and outputs indicating an actual future or immediate action taken by the target.

Based on the estimated trajectories and/or the inferred intentions, one or more processors of the computing system 610 may control steering components, braking components, and/or a gas pedal to navigate the vehicle 602 and plan a route that safely avoids the trajectories of the aforementioned vehicles and pedestrians. For example, the planned route may maximize or optimize a safety by minimizing a risk of collision, or of a trajectory of the vehicle 602 intersection with one or more of the trajectories 641, 643, 645, 647, 649, and/or 651.

Figure 7:
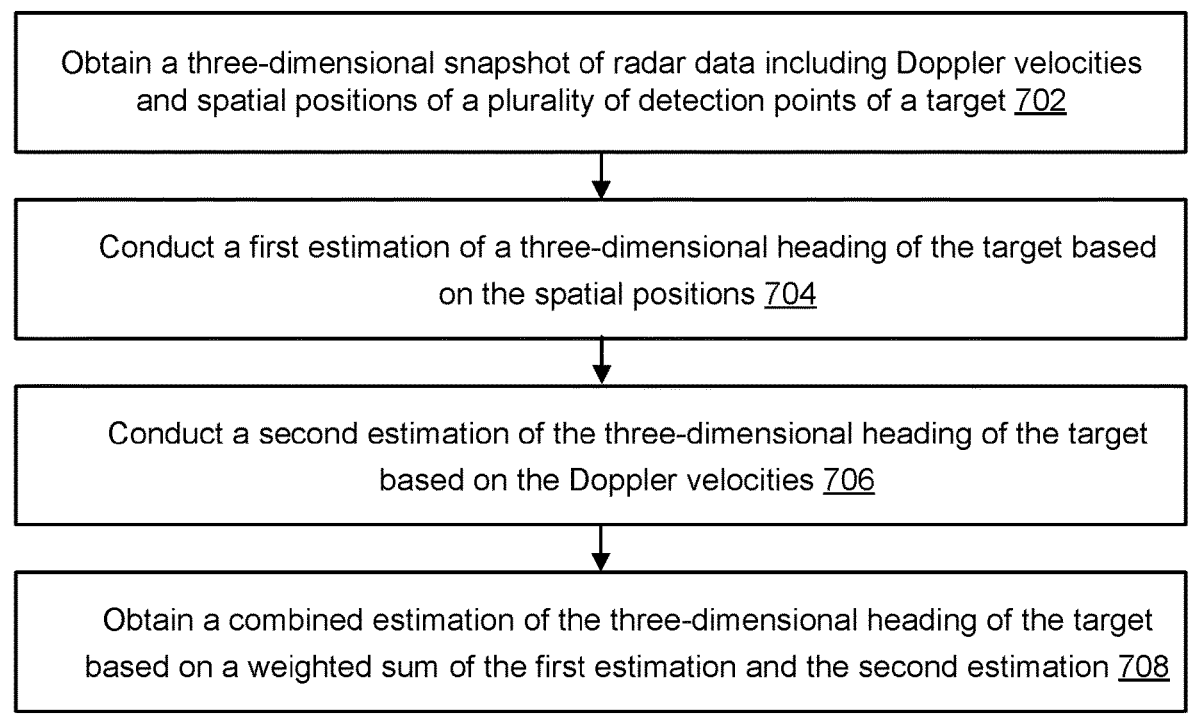
FIG. 7 illustrates a flowchart of an example of a method of estimating a heading of a target in accordance with the aforementioned disclosures.

FIG. 7 illustrates a flowchart of a method according to some embodiments. In this and other flowcharts, the flowchart 700 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 7.

In step 702, one or more radar sensors and/or processors may obtain a three-dimensional (3D) snapshot of radar data including Doppler velocities and spatial positions of a plurality of detection points of a target. In step 704, one or more processors may conduct a first estimation of a 3D heading of the target based on the spatial positions. In step 706, one or more processors may conduct a second estimation of the 3D heading of the target based on the Doppler velocities. In step 708, one or more processors may obtain a combined estimation of the 3D heading of the target based on a weighted sum of the first estimation and the second estimation.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 8:
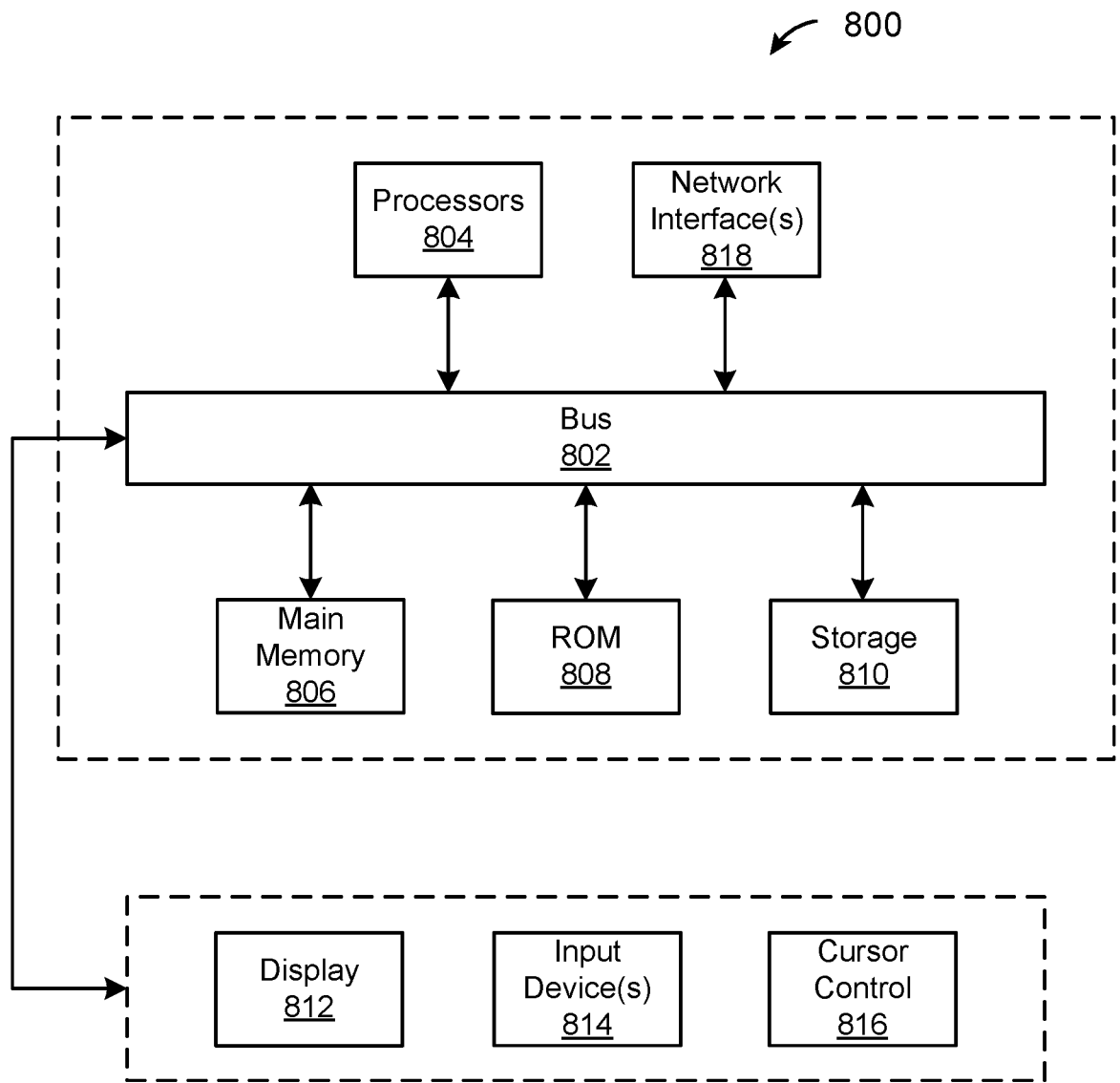
FIG. 8 is a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. A description that a device performs a task is intended to mean that one or more of the hardware processor(s) 804 performs.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816. The computer system 800 also includes a communication interface 818 coupled to bus 802.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

The invention claimed is:

1. A computer implemented method performed by one or more processors, comprising:
    obtaining a three-dimensional (3D) snapshot of radar data comprising Doppler velocities and spatial positions of a plurality of detection points of a target, wherein the obtaining of the 3D snapshot comprises:
        in response to a numerical quantity of detection points along a dimension being less than a threshold number of points, fusing, using a convolutional neural network (CNN), remaining detection points along other two dimensions with Lidar data along the dimension to obtain the Doppler velocities and the spatial positions of the remaining detection points;
    conducting a first estimation of a 3D heading of the target based on the spatial positions;

conducting a second estimation of the 3D heading of the target based on the Doppler velocities; and obtaining a combined estimation of the 3D heading of the target based on a weighted sum of the first estimation and the second estimation.

2. The computer implemented method of claim 1, further comprising determining a first weight associated with the first estimation of the weighted sum and a second weight associated with the second estimation of the weighted sum based on respective first and second weights, obtained from a previous cycle, at a location within a threshold distance of at least a portion of the spatial positions.

3. The computer implemented method of claim 1, wherein the conducting the second estimation is further based on a least-squares solution of a velocity vector of the target.

4. The computer implemented method of claim 1, wherein the conducting the second estimation is further based on directions from each of the detection points to a radar sensor used to obtain the 3D snapshot and magnitudes of Doppler speeds at each of the detection points.

5. The computer implemented method of claim 1, further comprising:
determining, based on the first estimation, a 3D bounding region enclosing the detection points, the 3D bounding region indicating an orientation and a dimension of the target.

6. The computer implemented method of claim 5, wherein the conducting the first estimation of the 3D heading comprises determining a cuboid bounding region that minimizes a sum of distances from each detection point to a surface of the cuboid bounding region.

7. The computer implemented method of claim 6, wherein the distances are determined from each detection point to a nearest surface of the determined cuboid bounding region.

8. The computer implemented method of claim 5, further comprising determining a first weight associated with the first estimation of the weighted sum and a second weight associated with the second estimation of the weighted sum based on a variance of the combined estimation.

9. The computer implemented method of claim 5, wherein the snapshot comprising the radar data is obtained from multiple radar sensors; and
the determining the 3D boundary region is based on the radar data obtained from the multiple radar sensors.

10. The computer implemented method of claim 5, further comprising:
obtaining a second snapshot of Lidar data comprising a plurality of second detection points within second threshold distances of at least a portion of the detection points;
determining, based on the second snapshot, a second 3D bounding region enclosing the second detection points;
determining whether boundaries of the second 3D bounding region are within third threshold distances of surfaces of the 3D bounding region; and
in response to determining that the surfaces of the second 3D bounding region are within third threshold distances of the surfaces of the 3D bounding region, fusing the 3D bounding region and the second 3D bounding region.

11. The computer implemented method of claim 5, further comprising:
obtaining a third snapshot of camera data comprising a plurality of third detection points within third threshold distances of at least a portion of the detection points;
determining, based on the third snapshot, a third 3D bounding region enclosing the third detection points;
determining whether boundaries of the third 3D bounding region are within fourth threshold distances of surfaces of the 3D bounding region; and
in response to determining that the surfaces of the third 3D bounding region are within fourth threshold distances of the surfaces of the 3D bounding region, fusing the 3D bounding region and the third 3D bounding region.

12. The computer implemented method of claim 5, wherein each of the detection points contacts a surface of the 3D bounding region or is located in an interior of the 3D bounding region.

13. A system configured to determine a three-dimensional (3D) heading of a target, comprising:
a radar sensor configured to obtain at least a portion of a 3D snapshot of radar data comprising Doppler velocities and spatial positions of a plurality of detection points of a target;
a Lidar sensor configured to capture Lidar data;
one or more processors; and
a memory storing instructions that, when executed by the one or more processors, causes the system to perform:
in response to a numerical quantity of detection points along a dimension being less than a threshold number of points, fusing, using a convolutional neural network (CNN), remaining detection points along other two dimensions with Lidar data along the dimension to obtain the Doppler velocities and the spatial positions of the remaining detection points;
conducting a first estimation of the 3D heading of the target based on the spatial positions;
conducting a second estimation of the 3D heading of the target based on the Doppler velocities; and
obtaining a combined estimation of the 3D heading of the target based on a weighted sum of the first estimation and the second estimation.

14. The system of claim 13, wherein the instructions further cause the system to perform:
determining a first weight associated with the first estimation of the weighted sum and a second weight associated with the second estimation of the weighted sum based on respective first and second weights, obtained from a previous cycle, at a location within a threshold distance of at least a portion of the spatial positions.

15. The system of claim 13, wherein the conducting the second estimation is further based on a least-squares solution of a velocity vector of the target.

16. The system of claim 13, wherein the instructions further cause the system to perform:
determining, based on the first estimation, a 3D bounding region enclosing the detection points, the 3D bounding region indicating an orientation and a dimension of the target.

17. The system of claim 16, further comprising a second radar sensor configured to obtain a second portion of the 3D snapshot comprising the radar data; and
the determining the 3D boundary region is based on the portion and the second portion of the snapshot.

18. The system of claim 16, wherein the conducting the first estimation of the 3D heading comprises determining a cuboid bounding region that minimizes a sum of distances from each detection point to a surface of the cuboid bounding region.

19. The system of claim 18, wherein each of the detection points contacts a surface of the cuboid bounding region or is located in an interior of the cuboid bounding region.

\* \* \* \* \*